S. SNELL.
BARLEY-FORK.
No. 169,594.
Patented Nov. 2, 1875.
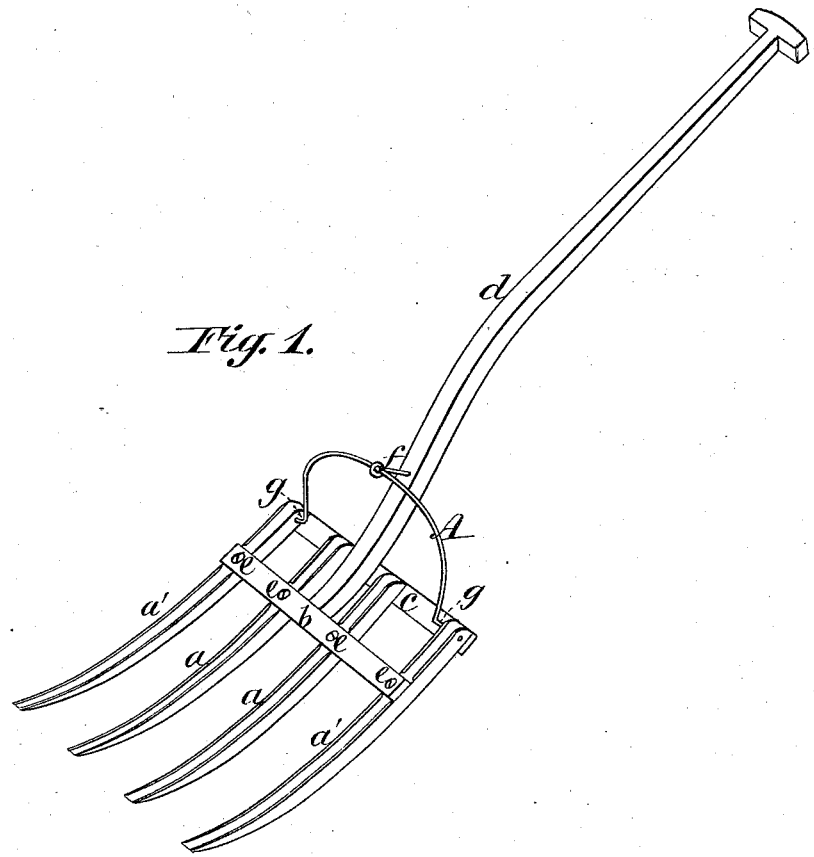
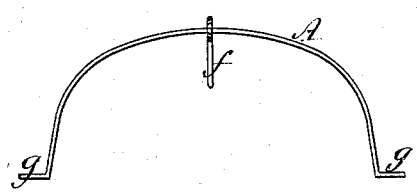
Witnesses:
J. West Wagner.
J. H. Rutherford.
Inventor:
Sylvester Snell,
By Johnson and Johnson
Attorneys

UNITED STATES PATENT OFFICE

SYLVESTER SNELL, OF WATERTOWN, NEW YORK.

IMPROVEMENT IN BARLEY-FORKS.

Specification forming part of Letters Patent No. 169,594, dated November 2, 1875; application filed September 6, 1875.

*To all whom it may concern:*

Be it known that I, SYLVESTER SNELL, of Watertown, in the county of Jefferson and State of New York, have invented certain new and useful Improvements in Barley-Forks; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My desire is to offer to farmers and the public a light, cheap, and serviceable barley-fork, so constructed, and in such a simple manner, that it can be readily repaired, all the parts being so made and put together as to allow any one to be replaced when broken; and I have for this purpose produced a wooden barley-fork, the particular invention wherein consists in providing the fork with a cradle-bow or grain-guard, which fastens itself by its own expansive force to the outside tines of the fork, its ends being bent and held in sockets in the inner sides of said tines, thus dispensing with such weakening mechanical means as screw-nuts and the like, as will be hereinafter more fully described.

In the accompanying drawings, Figure 1 represents a view in perspective of a wooden barley-fork embracing my invention, and Fig. 2 a view of the spring-bow attached.

The tines $a$ of the wooden fork are secured to an upper and a lower cross-bar, $b$ and $c$, the lower one, $c$, uniting their ends, and the upper one, $b$, crossing their upper sides, and uniting them to the handle $d$, which is also fastened to the lower bar. All these parts are secured by wood-screws $e$, the heads of which lie flush with the outer sides of the parts, into which they are inserted. The handle $d$ is secured between the cross-bars $b$ $c$—that is, upon the upper side of the lower one and the under side of the upper one, and, being fastened by wood-screws, and thus secured without recourse to mortising, is very strong and durable. Every piece of one fork will fit in its corresponding place in another fork, and the method of fastening by screws permits of the easy repairing of the fork should any of its parts become broken.

In order to hold the grain upon the tines in manipulating the fork, I have attached thereto a metallic spring cradle-bow or grain-guard, A, which is braced at a suitable angle against the handle $d$ by an eye, $f$, rising from said handle. The ends $g$ of this spring-bow are bent or elbowed, and rest in sockets or confining-holes in the inner sides of the outside tines $a'$ $a'$, and are held therein by the expansive force exerted by the spring-bow, and the cradle-bow is thus kept at its proper angle and in its proper place by the raised eye from the fork-handle and its own spring force. This method of fastening permits also of the removal of said bow without the use of any tool.

All screw-nuts, bolts, and lap-fastenings are dispensed with, and the tines and handle are not weakened by the boring of holes or the splitting tendency of bolts.

The fork, with its bow, may be used for taking much larger fork-loads, and for a much longer time, than if constructed without special reference to the objects heretofore set forth.

I am aware that a bow or grain-guard has been supported upon the handle by a brace, and combined with the projecting wrists of a cast socketed head, and made removable therefrom, and I do not claim such invention, but only the improved way in which I use the spring force of the bow to hold and fasten itself into the tines to avoid outside projections.

The following is claimed as new in barley-forks, viz:

A barley-fork constructed substantially as described, and having the braced cradle-bow or grain-guard A, with its angle ends $g$ $g$ retained in sockets in the inner sides of the outer tines $a'$ $a'$ by the spring force of the bow, as shown, and for the purpose described.

In testimony that I claim the foregoing, I have affixed my signature in presence of two witnesses.

SYLVESTER SNELL.

Witnesses:
EDMUND B. WYNN,
WILBUR A. PORTER.